US007954361B2

(12) United States Patent
Schelhas et al.

(10) Patent No.: US 7,954,361 B2
(45) Date of Patent: Jun. 7, 2011

(54) METHOD AND APPARATUS FOR DETECTING TANK LEAKS

(75) Inventors: Peter Schelhas, Stuttgart (DE); Manfred Franz, Ditzingen (DE); Andreas Posselt, Muehlacker (DE); Andreas Baumann, Farmington Hills (DE); Martin Streib, Vaihingen (DE); Michael Pfeil, Schwieberdingen (DE); Marko Lorenz, Grossbottwar (DE); Silke Haag, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 12/066,236

(22) PCT Filed: Nov. 13, 2006

(86) PCT No.: PCT/EP2006/068382

§ 371 (c)(1), (2), (4) Date: Mar. 7, 2008

(87) PCT Pub. No.: WO2007/065771

PCT Pub. Date: Jun. 14, 2007

(65) Prior Publication Data

US 2008/0196482 A1 Aug. 21, 2008

(30) Foreign Application Priority Data

Dec. 7, 2005 (DE) ........................ 10 2005 058 298

(51) Int. Cl.
*G01M 3/26* (2006.01)

(52) U.S. Cl. ........................................................ 73/49.2

(58) Field of Classification Search ................... 73/49.2, 73/49.7, 291, 299, 302, 290 B
See application file for complete search history.

(56) References Cited

U.S. PATENT DOCUMENTS

| | | | | |
|---|---|---|---|---|
| 1,656,068 | A * | 1/1928 | Kamerman | 73/299 |
| 4,091,669 | A * | 5/1978 | Fehr et al. | 73/299 |
| 4,291,575 | A * | 9/1981 | Frissora | 73/302 |
| 4,353,245 | A * | 10/1982 | Nicolai | 73/49.2 |
| 4,602,344 | A * | 7/1986 | Ferretti et al. | 702/55 |
| 4,736,329 | A * | 4/1988 | Ferretti et al. | 700/281 |
| 4,739,648 | A * | 4/1988 | Horner | 73/49.2 |
| 5,247,971 | A | 9/1993 | Talu | |
| 5,319,956 | A * | 6/1994 | Bogle et al. | 73/40.5 A |
| 5,461,906 | A * | 10/1995 | Bogle et al. | 73/49.2 |
| 6,282,953 | B1 | 9/2001 | Benjey | |
| 6,334,355 | B1 | 1/2002 | Grieve et al. | |
| 6,880,383 | B2 * | 4/2005 | Mc Lain et al. | 73/49.2 |
| 7,168,297 | B2 * | 1/2007 | Herzog et al. | 73/49.2 |
| 7,409,852 | B2 * | 8/2008 | Herzog et al. | 73/49.2 |
| 7,712,352 | B2 * | 5/2010 | Wolford et al. | 73/49.2 |
| 2005/0126265 | A1 * | 6/2005 | Herzog et al. | 73/49.2 |
| 2007/0033987 | A1 * | 2/2007 | Herzog et al. | 73/49.2 |
| 2008/0098800 | A1 * | 5/2008 | Herzog et al. | 73/49.2 |
| 2008/0196482 | A1 * | 8/2008 | Schelhas et al. | 73/49.2 |

FOREIGN PATENT DOCUMENTS

| | | |
|---|---|---|
| DE | 41 24 465 | 1/1993 |
| DE | 196 25 702 | 1/1998 |
| DE | 196 36 431 | 3/1998 |
| DE | 198 04 384 | 1/1999 |
| DE | 102 48 470 | 5/2003 |
| DE | 103 12 588 | 9/2004 |
| EP | 0 611 674 | 8/1994 |
| JP | 6-173837 | 6/1994 |
| WO | WO 91/18266 | 11/1991 |

* cited by examiner

*Primary Examiner* — John Fitzgerald
(74) *Attorney, Agent, or Firm* — Merchant & Gould P.C.

(57) ABSTRACT

Method and apparatus for detecting tank leaks, in which a gas pressure acts on a fluid which is situated in a tank, and in which the gas pressure in the tank or tank system is changed, wherein a tank leak is detected by evaluation of a temporal profile of a sum pressure of the fluid which is situated in the tank.

5 Claims, 1 Drawing Sheet

METHOD AND APPARATUS FOR DETECTING TANK LEAKS

TECHNICAL FIELD

The invention proceeds from a method for detecting tank leaks according to the class of the independent claim as well as a corresponding apparatus.

BACKGROUND

From the German patent DE 103 12 588 A1, a method is already known, in which a vacuum is produced in a fuel tank by way of a pump. The pressure is measured in the gas volume of the tank. If the increase in pressure occurs faster than that which is known for an impervious fuel tank system, a leak is detected.

Additional methods for testing for leaks, especially in a fuel tank ventilation system of a motor vehicle, are, for example, known from the German patents DE 41 24 465, DE 19636 431, DE 198 04 384 and also DE 196 25 702. In these methods, the fuel tank ventilation system is pressurized with an excess pressure; and by a subsequent evaluation of the pressure profile, the presence of a tank leak can possibly be suggested.

Methods are additionally known from the Japanese patent JP-6-173837 and the American patent U.S. Pat. No. 5,247,971, in which a reference leakage is switched in and in which a conclusion is drawn about the presence of a leak by comparing the measurements with or without the reference leakage.

Common to the methods is that a definite state of origin, respectively starting pressure, is initially set for the detection of leaks. After this the pressure profile which ensues is measured, whereby at least the one pressure sensor is disposed in the gas volume of the fuel tank or in that of the fuel tank ventilation system. If the measured pressure profile deviates significantly from an expected pressure profile, it is typically assumed that a leak is present in the fuel tank, respectively in the fuel tank system.

Additional pressure sensors, which, however, are not for the detection of tank leaks but for the acquisition of the fill level, are known, for example, from the American patent U.S. Pat. No. 6,282,953. Provision is made here for two pressure sensors, which project into the fuel, to be disposed vertically to the alignment of the bottom of the fuel tank. Said sensors acquire a pressure of the fuel. Additionally a pressure sensor is disposed on the top of the fuel tank, which acquires the pressure of the gas volume above the liquid fuel. A fill level of the fuel tank capacity is ascertained when the pressures measured at all three of the sensors are taken into account.

SUMMARY OF THE INVENTION

The method according to the invention for detecting tank leaks has in contrast the advantage, in that if a gas pressure of a gas volume is changed in a tank or tank system, tank leaks are detected by evaluation of a temporal profile of a pressure of the fluid which is situated in the tank. If the pressure profile ascertained deviates significantly from an expected pressure profile, it is typically assumed that a leak is present in the tank, respectively the tank system.

This procedure has the advantage, in that provision does not have to be made for any additional sensors or other acquisition wherewithal if, for example, a pressure sensor, which is already disposed in the tank for determining the fill level, can be used for detecting leaks.

This advantage also particularly takes effect with regard to an apparatus for detecting tank leaks, wherein acquisition wherewithal acquires a cumulative pressure of a fluid which is situated in the tank; and evaluation wherewithal detects tank leaks as a function of the acquired sum pressure profile.

By means of the measures specified in the sub-claims, advantageous modifications of and improvements in the method stated in the main claim are possible.

Additionally it proves to be advantageous to change the gas pressure in the tank by adjusting certain conditions in the tank, respectively the tank system, in such a way that a gas pressure already known ensues, whereby a fill level can then be ascertained as a function of this gas pressure, which is already known.

Furthermore, it is advantageous when detecting tank leaks if the ensuing gas pressure, which is already known, is additionally taken into account, so that the accuracy of the pressure change to be expected during the diagnosis can be determined in an advantageous manner by means of this additional parameter.

Provision is made in an additional expedient embodiment for the acquisition wherewithal, respectively the pressure sensor, to be designed as a differential pressure sensor. This has the advantage; in that especially when comparing a differential pressure measurement with atmospheric pressure—for example when filling the tank, such a sensor acquires a pressure, which is proportional to the fill level of the fluid situated in the tank.

Examples of embodiment of the invention are depicted in the diagrams and explained in detail in the following description.

BRIEF DESCRIPTION OF THE DRAWINGS

The following are shown.

DETAILED DESCRIPTION

Figure 1:
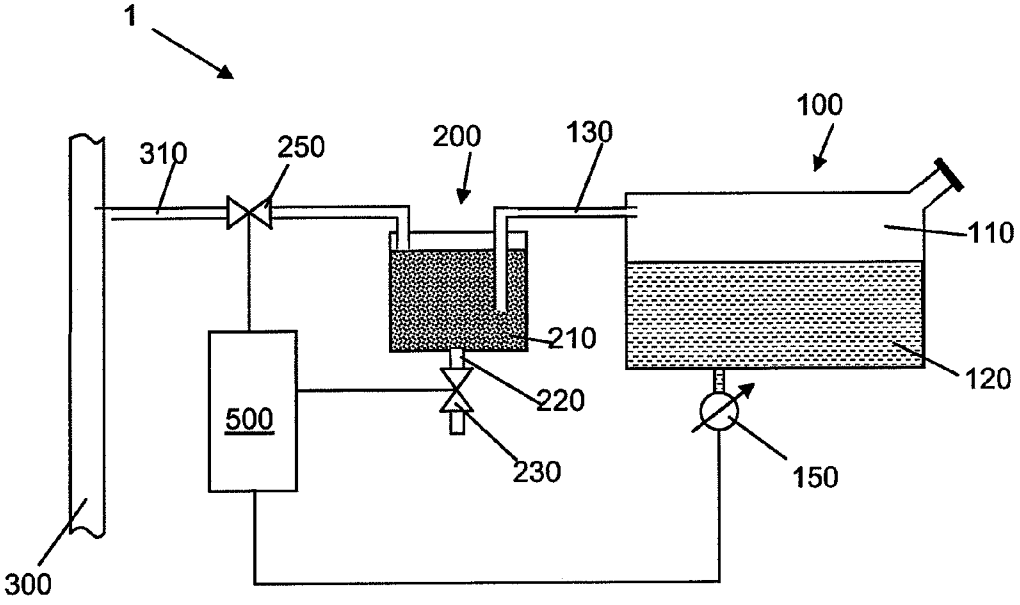
FIG. 1 a tank with a known tank ventilation apparatus and a pressure measurement according to the invention, FIG. 2 pressure profiles of a typical tank leak diagnosis.

FIG. 1 shows a tank system 1, which essentially comprises a tank 100, an accumulator 200 as well as a tank ventilation valve 250 as the main components. A gas volume 110, which typically consists of an air-fuel vapor mixture, is located above the fuel 120. For the purpose of ventilating the tank 100, the tank 100 with its gas volume 110 is connected to the accumulator 200 by way of the ventilation line 130 and by way of the tank ventilation valve 250 and an intake line 310 with an intake manifold 300 of a non-specified internal combustion engine.

During a tank ventilation, the air-fuel vapor mixture flows from the gas volume 110 via the ventilation line 130 into an accumulation agent 210, preferably activated charcoal, of the accumulator 200 in order to be reversibly bound there in a known manner. For the regeneration of the accumulation agent 210, provision is typically made for the accumulation agent 210 to be flushed with fresh air and for the extracted hydrocarbons to be fed to the intake manifold 300 and thus to a combustion in the internal combustion engine. In so doing, the tank ventilation valve 250 and a tank check valve 230 are opened during the operation of the internal combustion engine. Due to the prevailing vacuum in the intake manifold 300 during the operation of the internal combustion engine, fresh air flows into the accumulator 200 by way of the tank check valve 230 and the aeration line 220 and releases the adsorbed hydrocarbons in the accumulation agent 210. A control unit 500 controls the tank ventilation and the tank check valve 250, 230 as a rule in such a way that the metering of the adsorbed hydrocarbons results as a function of the operating state of the internal combustion engine.

FIG. 1 additionally depicts an inherently known fill level acquisition of the tank contents by way of a pressure sensor 150. As depicted in FIG. 1, a pressure sensor 150 of this kind, which serves to acquire the fill level, is disposed in the vicinity of the bottom of the tank, preferably at the lowest point of the tank. Other configurations are, however, also conceivable for a later leak diagnosis. From the pressure ascertained by way of the pressure sensor 150, a fill level is ascertained while taking into account the conditions in the tank, respectively tank system, which are adjusted if necessary. The pressure $p_S$ existing at the pressure sensor comprises the pressure $p_K$ of the liquid fuel 120—fluid pressure—and the pressure $p_G$ of the gas volume 110 active above the liquid fuel—gas pressure—and is also denoted as the cumulative pressure $p_S$.

$$p_S=p_k+p_g$$

When the gas pressure $p_g$ is known, the fluid pressure $p_k$ of the fuel therefore results as a matter of course after the cumulative pressure $p_S$ has been ascertained. A fill level can then be ascertained from said fluid pressure $p_k$ itself, when the density of the fuel is known.

If, for example, the pressure sensor 150 is designed as a differential pressure sensor, which, for example, measures in comparison with atmospheric pressure, the atmospheric pressure is also present in the gas volume 110 when the tank check valve 230 is open. The differential pressure acquired at the pressure sensor 150 then corresponds to the fuel pressure $p_K$, from which the fill level can then be ascertained in a known manner.

Provision is now made according to the invention to also use the pressure sensor 150, which is present anyway for the fill level measurement and which does not absolutely have to be designed as a differential pressure sensor, for the detection of a tank leak, respectively a leak in the tank system.

Figure 2:
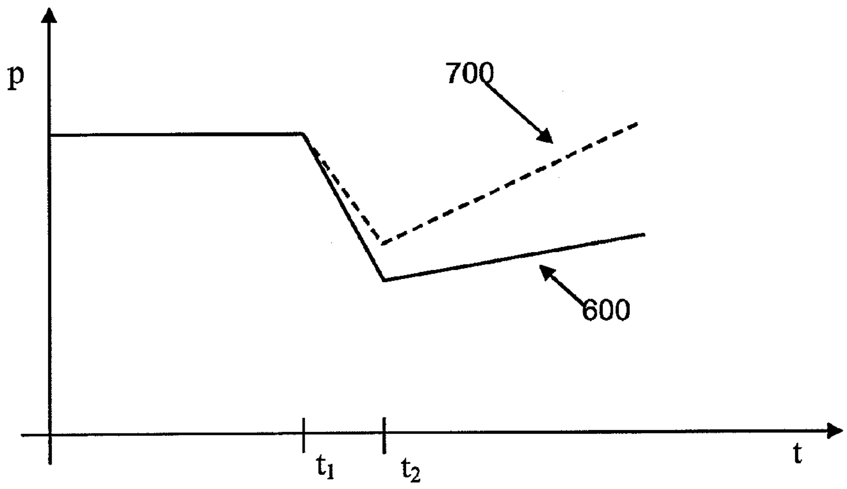

Typical pressure profiles as they occur during an inherently known diagnostic procedure for tank leaks are schematically depicted in FIG. 2 in a pressure versus time diagram. The solid line 600 represents a pressure profile in an impervious system and the dashed line 700 in a leaky system. At a first point in time t1, the tank system is evacuated, the pressure drops in a manner already known.

The evacuation of the system can, for example, occur by opening the tank ventilation valve 250 during defined operating conditions of the internal combustion engine, whereby a gas pressure $p_g$ in the gas volume 110 of the tank 100 arises. The evacuation can, however, also take place using a separate pump. Provision can also especially be made to increase the pressure in order to then subsequently observe a drop in pressure.

Provision is made in the case depicted in FIG. 2 to interrupt the evacuation of the system at a second point in time $t_2$ and to close the tank ventilation valve 250.

Depending on the size of the gas volume 110 enclosed in the tank 100 and the absolute gas pressure prevailing in the tank 100 as well as the fuel temperature, a certain increase in pressure ensues according to the universal equation of state for gases.

When the tank system is leaky, the pressure in the gas volume will increase faster than expected as depicted by the dashed curve 700. The increase in pressure is monitored and evaluated by the control unit 500. If the pressure gradient exceeds a predetermined threshold value, the control unit 500 detects a leak.

From the state of the art mentioned at the beginning of the application, it has only been known up until now that the absolute pressure in the gas volume 110 of the tank 100 is ascertained during the tank leak diagnosis. Depending on which parameters are taken into account during the evaluation, this is also if need be compellingly necessary. In principle the diagnostic procedure, respectively the evaluation, can, however, be constructed in such a way that the absolute pressure of the gas volume has no or only a small influence on the detection of the leak. The detection of leaks still essentially depends in such a case only on the slope of the pressure profile.

Provision is now made according to the invention for the increase in pressure to be acquired by a pressure sensor 150 for the determination of the fill level. For the determination of a temporal change in pressure resulting from an implemented leak diagnosis, the constant fluid pressure $p_K$ caused by the fill level of the fuel does not play a role. As described above, the cumulative pressure $p_S$ acquired at the pressure sensor comprises the fuel pressure $p_K$ and the gas pressure $p_G$:

$$p_S=p_k+p_g$$

It is, however, sufficient for the tank leak diagnosis to consider only the slope of the pressure profile. In so far as that is the case, the following equations are valid:

$$dp_S/dt=d(p_k+p_G)/dt=dp_G/dt$$

As the fill level remains practically constant in the allotted diagnostic time period, the fuel pressure $p_K$ resulting from this is insignificant in the evaluation of the pressure gradient.

If the fill level is already known during the tank leak diagnosis, the absolute gas pressure $p_G$ in the gas volume 110 can, of course, also be ascertained if required.

The method according to the invention is, however, not limited to the tank leak diagnosis, which is depicted. It is also especially conceivable to increase the gas pressure in the tank 100 and to compare the ensuing drop in pressure with an expected drop in pressure. If the pressure drops faster than expected, the tank system is probably leaky.

Furthermore, the pressure profile can also be evaluated when evacuating the tank or during an increase in pressure.

The invention claimed is:

1. A method for detecting tank leaks, wherein a gas pressure acts on a fluid situated in a tank and wherein the gas pressure in the tank is changed, the method comprising:
   - acquiring a cumulative pressure of the fluid situated in the tank;
   - detecting a tank leak by evaluating a temporal profile of the cumulative pressure;
   - adjusting conditions in the tank to induce an ensuing gas pressure of a gas volume to a predetermined pressure; and
   - ascertaining a fill level of the fluid in the tank based on the cumulative pressure and the ensuing gas pressure.

2. A method according to claim 1, wherein detecting includes taking into account the ensuing gas pressure.

3. An apparatus for detecting tank leaks, comprising:
   - an acquisition mechanism configured to: acquire a cumulative pressure of a fluid situated in a tank; detect a tank leak by evaluating a temporal profile of the cumulative pressure; adjust conditions in the tank to induce an ensuing gas pressure of a gas volume to a predetermined pressure; and ascertain a fill level of the fluid in the tank based on the cumulative pressure and the ensuing gas pressure.

4. An apparatus according to claim 3, wherein the acquisition mechanism is a pressure sensor.

5. An apparatus according to claim 4, wherein the pressure sensor is a differential pressure sensor.

* * * * *